United States Patent [19]

Koyamada et al.

[11] Patent Number: 5,742,293

[45] Date of Patent: Apr. 21, 1998

[54] DATA VISUALIZER UTILIZING EXTERIOR SELECTED AND DEPTH SORTED POLYHEDRON FACES

[75] Inventors: Koji Koyamada, Hadano; Akio Doi, Machida; Sakae Uno, Hachioji, all of Japan

[73] Assignee: International Business Machines Corporation, Armonk, N.Y.

[21] Appl. No.: 607,048

[22] Filed: Feb. 26, 1996

Related U.S. Application Data

[63] Continuation of Ser. No. 78,715, Jun. 17, 1993, abandoned.

[30] Foreign Application Priority Data

Jun. 19, 1992 [JP] Japan .................................. 4-159909

[51] Int. Cl.$^6$ .................................................. G06T 15/40
[52] U.S. Cl. ............................ 345/421; 345/424; 345/427
[58] Field of Search ................................. 395/127, 121-2, 395/133, 119, 118, 124, 126-7

[56] References Cited

U.S. PATENT DOCUMENTS

| | | | |
|---|---|---|---|
| 4,940,972 | 7/1990 | Mouchot et al. | 395/121 |
| 4,952,922 | 8/1990 | Griffin et al. | 395/121 |
| 4,985,856 | 1/1991 | Kaufman et al. | 395/124 |
| 5,038,302 | 8/1991 | Kaufman | 395/124 |
| 5,113,357 | 5/1992 | Johnson et al. | 395/124 |
| 5,363,475 | 11/1994 | Baker et al. | 395/122 |
| 5,555,352 | 9/1996 | Lucas | 395/123 |

OTHER PUBLICATIONS

Koide et al; *Polyhedral Approximation Approach to Molecular Orbital Graphics*; 1986; pp. 149–155.

Kaufman et al.; *3D Scan–Conversion Algorithms for Voxel–Based Graphics*; 1986; pp. 45–75.

Sabella, Paolo; *A Rendering Algorithm for Visualizing 3D Scalar Fields*; 1988; pp. 51–58.

Max et al.; *Area and Volume Coherence for Efficient Visualization of 3D Scalar Functions*; 1990; pp. 27–33.

Koyamada et al.; *Volume Rendering Algorithm for FEM Simulation Results—Application to Clean Room Airflow Analysis Results–*; 1991; pp. 1–32.

Proceedings Reprint; *SPIE—The International Society for Optical Engineering*, vol. 1259, "Volume Visualization for the Unstructured Grid Data", K. Koyamada., 1990.

Computer Graphics, vol. 24, No. 5, Nov. 1990, "A Polygonal Approximation to Direct Scalar Volume Rendering", P. Shirley et al, pp. 63–71.

Computer Graphics, vol. 24, No. 5, Nov. 1990, "Raytracing Irregular Volume Data", M. P. Garrity, pp. 35–41.

Frieder et al.; "Back–to–Front Display of Voxel–Based Objects"; IEEE Computer Graphics and Applications; 5(1); pp. 52–60; Jan. 1985.

M. Levoy; "Display of Surfaces from Volume Data"; IEEE Computer Graphics and Applications; May 1988; pp. 29–37.

Upson et al.; "V–Buffer Visible Volume Rendering"; Computer Graphics; vol. 22; No. 4; pp. 59–64; Aug. 1988.

*Primary Examiner*—Phu K. Nguyen
*Assistant Examiner*—Rudolph J. Buchel
*Attorney, Agent, or Firm*—David A. Mims, Jr.; Mark S. Walker

[57] ABSTRACT

To provide high-speed volume rendering without computing the points at which a viewing ray intersects with the boundaries of a volume data area. Visualizing a volume entails: selecting the exterior faces that face toward a viewing point from among a plurality of exterior faces of a volume data area, sorting the ones thus selected according to distance from the viewing point, selecting those exterior faces in the sorting order, and determining pixels on a projection plane corresponding to the exterior faces in question by scan conversion; computing pixel values along each viewing ray passing through each pixel for each corresponding exterior face until a final exterior face is encountered; such a final exterior face can be judged from information on many partial solids restricting the volume data area; when a viewing ray enters the volume data area again, pixel values to be added later on another exterior face are computed and added to the previous pixel values; the completion of processing of all exterior faces facing toward a viewing point is tantamount to the completion of processing all viewing rays.

6 Claims, 4 Drawing Sheets

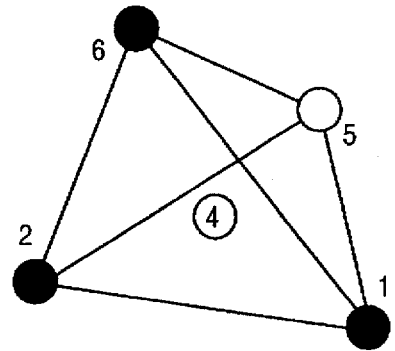

EXTERIOR FACE DATA — 10

| EXTERIOR FACE ID | TETRAHEDRON ID | INTERIOR FACE ID |
|---|---|---|
| 1 | 12 | 1 |
| 2 | 4 | 4 |
| ⋮ | ⋮ | ⋮ |

TETRAHEDRON LIST — 8

| TETRA-HEDRON ID | LATTICE POINT $ID_1$ ($G_1$) | LATTICE POINT $ID_2$ ($G_2$) | LATTICE POINT $ID_3$ ($G_3$) | LATTICE POINT $ID_4$ ($G_4$) | ADJA-CENT CELL $ID_1$ | ADJA-CENT CELL $ID_2$ | ADJA-CENT CELL $ID_3$ | ADJA-CENT CELL $ID_4$ |
|---|---|---|---|---|---|---|---|---|
| 1 | 16 | 5 | 1 | 4 | | | | |
| 2 | 4 | 11 | 7 | 5 | | | | |
| 3 | 2 | 8 | 22 | 6 | | | | |
| 4 | 6 | 2 | 1 | 5 | | | | |
| ⋮ | ⋮ | ⋮ | ⋮ | ⋮ | | | | |

LATTICE POINT INFORMATION — 9

| | LATTICE POINT COORDINATES | | | SCALAR DATA | GRADIENT VECTOR | | | DISTANCE DATA |
|---|---|---|---|---|---|---|---|---|
| | X | Y | Z | S | $V_z$ | $V_y$ | $V_x$ | X |
| 1 | 1.0 | 0.0 | 0.0 | 10.0 | 1.1 | 1.3 | 0.5 | 50.1 |
| 2 | 1.0 | 1.0 | 0.0 | 9.7 | 0.5 | 1.5 | 0.0 | 37.1 |
| 3 | 1.0 | 0.0 | 0.0 | 8.1 | 0.2 | -1.1 | 1.4 | 29.7 |
| 4 | 1.0 | 1.0 | 0.0 | 7.4 | 0.0 | 1.3 | 0.1 | 41.0 |
| 5 | 2.0 | 0.0 | 0.0 | 9.2 | -1.2 | 1.3 | -1.1 | 53.0 |
| 6 | 2.0 | 1.0 | 0.0 | 13.6 | 1.3 | -0.7 | 0.5 | 58.1 |
| ⋮ | ⋮ | ⋮ | ⋮ | ⋮ | ⋮ | ⋮ | ⋮ | ⋮ |

FIG. 2

DATA VISUALIZER UTILIZING EXTERIOR SELECTED AND DEPTH SORTED POLYHEDRON FACES

This is a continuation of application Ser. No. 08/078,715 filed Jun. 17, 1993 now abandoned.

BACKGROUND OF THE INVENTION

1. Field of the invention

This invention relates to an apparatus that visualizes three-dimensionally distributed data by applying graphics technology, and its method.

This invention enables the volume rendering of irregular lattice data at high speed. Irregular lattice data is numerical data (volume data) defined on partial solid objects (cells) arranged arbitrarily in a three-dimensional space. Volume data of this type is standard in the field of structural analysis and is becoming of wider use also in the field of computational fluid dynamics, as commonly found in the results of finite element analysis. Again, volume rendering is a technique for computer graphics effective for global visualization of scalar fields defined in a three-dimensional space.

2. Description of the Related Art

The following has been published as the volume rendering methods for irregular lattice data:

(1) Ray Tracing Method

The ray tracing method consists of the steps of generating a ray traveling from a viewing point past each pixel and integrating volume data along the ray. For a concrete algorithm, refer to Koyamada's article, "Volume Visualization for the Unstructured Grid Data," *SPIE* Vol. 1259, pp. 14–25, 1990 or Garrity's article, "Raytracing Irregular Volume Data," *Computer Graphics*, Vol. 24, No. 5, pp. 35–40, 1990. Generally, ray tracing enables generation of images of high quality. Yet, much computation time is required for judging the intersection of the ray with an exterior face, which has had a large effect on the overall computation time required for volume rendering.

(2) Polygonal Approximation

The polygonal approximation method is designed for the effective use of three-dimensional graphics processors that process existing triangle primitives. First, original volume data is expressed as an aggregate of triangle data. Then color values and opacity are rated with respect to the vertices of triangles, and the rated results are imaged as an aggregate of triangles with the color values and opacity at each vertex by use of a graphics processor. For a concrete algorithm, refer to Shirley's article, "A Polygonal Approximation to Direct Scalar Volume Rendering," *Computer Graphics*, Vol. 24, No. 5, pp. 63–70, 1990. This method requires that such triangles have been sorted in advance in the direction of a viewing ray. When there are concave zones (hollows or holes) in original irregular lattice data, sorting may be impossible. If such irregular lattice data is simply sorted according to triangular barycenters, for instance, it is very likely for an ordering error to occur. This error would have a large effect on the quality of generated images. An attempt to sort such data accurately would incur a sharp increase in processing time. Moreover, the linear interpolation of color values and opacity within a triangular surface produces a large effect on the quality of generated images. The linear interpolation of color values and opacity which in themselves do not vary linearly onto triangles results in blur independent of the data distribution in its proper sense.

Also, Japanese Patent Application No. 4-48799 is a patent application relevant to this invention. The invention in this application is such that the constituent facets of cells are all sorted, and hence is distinguished from the present invention.

SUMMARY OF THE INVENTION

In volume rendering, it is a general practice to specify the nearest exterior face that intersects with a viewing ray, and to compute pixel values while tracing cells in sequence along the viewing ray from there. An exterior face is defined as a constituent facet of a cell that is shared with no other cell. In the course of tracing a cell, the viewing ray will finally go out of the volume data area (set of cells) through an exterior face. If the volume data area is concave, the viewing ray traveling outside the volume data area may enter the volume data area again through another exterior face. For this reason, it is generally necessary to further judge intersections with other exterior faces, even with regard to viewing rays that are temporarily traveling outside the volume data area. This intersection test must be conducted for each viewing ray, and the computation time for such intersection tests notably contributes to overall volume rendering time.

In this invention, exterior faces whose normals are directed toward a viewing ray are sorted in the direction of the viewing ray and are arranged in order of proximity to the viewing ray. (This corresponds to the case where the order of viewing ray searching is from front to back (FTB) along a viewing ray. In the case where this order is from back to front (BTF) along a viewing ray, exterior faces whose normals are directed counter to the viewing ray are sorted in the opposite direction to the viewing ray and are arranged in order of remoteness from the viewing ray.) Even in this case, simple sorting may still result in an ordering error, though the probability of this is relatively low compared with sorting that covers a whole tetrahedral cell. This is because the number of exterior faces whose normals are directed toward a viewing ray and that overlap as viewed from the same direction is still fewer than the number of tetrahedral cells that overlap as viewed from the direction of a viewing ray.

In this invention, the exterior faces thus sorted are then fetched in sequence, and each surface is subjected to scan conversion on a screen. On the screen, points of intersection are determined on the assumption that a viewing ray will intersect with the corresponding exterior face within the range where this surface exists. Related pixel values are then computed until the viewing ray goes out of the volume data area, while tracing the cells within the volume data area with these points of intersection as points of departure. The result is stored in a frame buffer for each pixel before proceeding to the processing of the next exterior face. If the volume data area is concave, a re-entry is made through another exterior face on the same viewing ray. The values in the frame buffer serve as initial values for pixel value computation in such a reentry. The frame buffer values thus finally obtained become the results of volume rendering.

One of the important points of this invention is that viewing ray searching, which used to be performed in viewing ray units, has been changed to searching in sorted exterior face units.

BRIEF DESCRIPTION OF THE DRAWINGS

FIG. 2 is an explanatory drawing of the volume data shown in FIG. 1;

DETAILED DESCRIPTION OF THE PREFERRED EMBODIMENT

Figure 1:
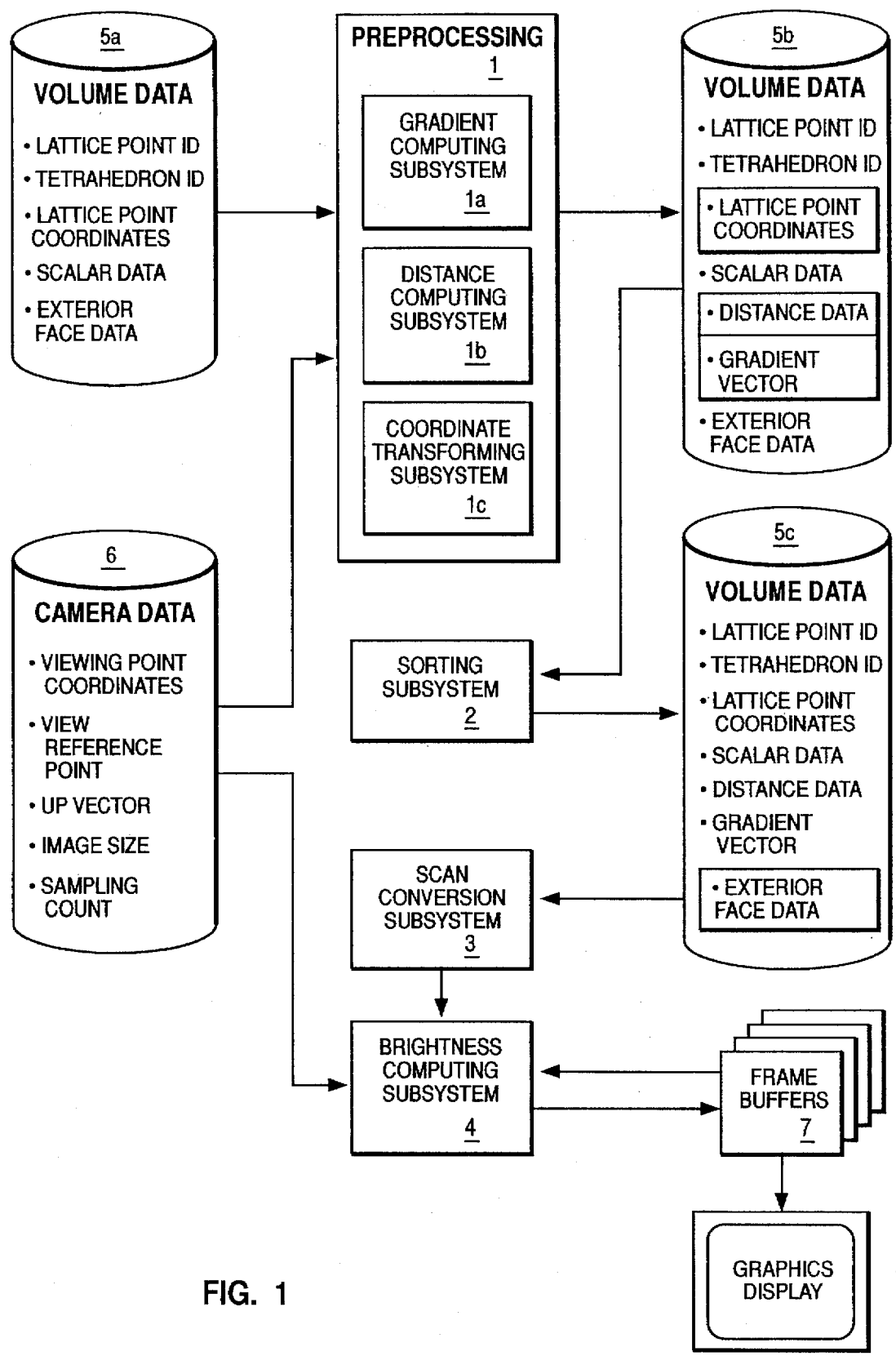
FIG. 1 is a general block diagram of the overall configuration of an embodiment of this invention.

FIG. 1 is a general block diagram of an image generator to which this invention is applied. The image generator achieves high-speed volume rendering on the basis of irregular lattice data, and consists of a preprocessor 1, an exterior face sorting subsystem 2, an exterior face scan conversion subsystem 3, and a brightness computing subsystems 4 as shown in FIG. 1. The preprocessor 1 includes a gradient computing subsystem 1a, a distance computing subsystem 1b, and a coordinate transformation subsystem 1c. Each block will be detailed later. Each subsystem is supplied input by or generates output as primary volume data 5a, secondary volume data 5b, tertiary volume data 5c, a rendering table 6, and frame buffers 7. Each subsystem is a module operating under the control of an IBM 3090/VM computer system, and the input/output of these subsystems occupies an area of the storage space of the IBM 3090. Collectively the subsystems comprise a computer programs product that can be stored on a variety of computer readable media such as tape and magnetic disk.

(1) Input/output of Subsystems

The following describes the input/output of each subsystem. The input/output includes volume data 5a, 5b, 5c, a rendering table 6, and frame buffers 7.

(a) Volume Data (Irregular Lattice Data Transformed into Tetrahedral Models)

As shown in FIG. 2, the primary volume data 5a consists of a tetrahedron list 8, lattice point information 9, and exterior face data 10. These are basically the same as those described in Koyamada et al's article, "Volume Rendering Method for Finite Element Method Results—Air Flow Visualization in a Clean Room," *Transactions of Information Processing Society of Japan*, Vol. 32, No. 5, pp. 560–569. The tetrahedron list 8 consists of tetrahedral cell constituent lattice point IDs and adjacent tetrahedral cell IDs. The lattice point information 9 consists of lattice point coordinates and scalar data for each lattice point, which are denoted as X,Y,Z;S. The exterior face data 10 consists of tetrahedral cell (with exterior faces) IDs and interior face IDs representing exterior faces. Letting the four lattice points constituting a tetrahedron be G1, G2, G3, and G4, its interior faces (triangles) are defined as follows:

inside-surface 1=[G2, G3, G4], inside-surface 2=[G4, G1, G2], inside-surface 3=[G4, G1, G2], inside-surface 4=[G1, G2, G3]

The above-mentioned primary volume data 5a is processed by the preprocessor 1, so that secondary volume data 5b is generated. The secondary volume data 5b is processed by the sorting subsystem 2, so that tertiary volume data 5c is generated.

(b) Rendering Table

The rendering table 6 consists of a color table, an opacity table, and camera data. In the color table and opacity table, the range from the maximum to the minimum of scalar data values is divided into suitable intervals, which are each represented as a serial natural number (ID). Also, the ratios of colors (red, green, and blue) and opacity (as an index of the difficulty of transmission of light) are described in correspondence to each ID. As to camera data, it is necessary to describe the information (a viewing point, a view reference point, image size, and an up vector to be transformed to the Y-axis of a screen coordinate system) required for the determination of a matrix of transformation to the screen coordinate system and the number of sampling points to be arranged along a viewing ray.

(c) Frame Buffers

The frame buffers 7 store interim results or final results (red, green and blue) of brightness computation, as will be described later. For FTB only, these buffers store the interim results of opacity computation accumulated as a viewing ray advances. A storage capacity of eight bits is required to store each component (red, green, blue, and opacity) per pixel. The size of the buffers depends on the image size described as camera data.

(2) Subsystems

The following explains how the subsystems behave.

The gradient computing subsystem 1a computes a gradient vector (denoted as "VX, VY, VZ") for each lattice point on the basis of the lattice point IDs of a tetrahedral cell, lattice point coordinates, and scalar data for each lattice point. The distribution of scalar data (S) in a tetrahedral cell is described as $S=a+ax*X+ay*Y+az*Z$, where a, ax, ay, and az are determined by the coordinate values and scalar values at four lattice points. Therefore, a gradient vector in a tetrahedral cell is computed as $(VX,VY,VZ)=grad(S)=(ax, ay, az)$, which is constant for the tetrahedral cell in question. In this subsystem, the results of computation for each tetrahedral cell are distributed to each lattice point and are added. The sum is then divided by the number of cells connecting to each lattice point, to find an average.

The distance computing subsystem 1b computes distance from a viewing point as described in the camera data at each lattice point and stores the result in memory as distance data (S).

The coordinate transformation subsystem generates a screen coordinate system by multiplying lattice point coordinates described in the global coordinate system by a coordinate transformation matrix created on the basis of the camera data. How to create a coordinate transformation matrix on the basis of camera data is common knowledge. One such method is dealt with in "Computer Display Aided Graphics Processing Engineering," Fujio Yamaguchi, *Nikkan Kogyo Shinbunsha*, pp. 161–172.

Secondary volume data 5b is generated by the gradient computing subsystem 1a, distance computing subsystem 1b, and coordinate transformation subsystem 1c mentioned above. The sections enclosed in rectangles in block 5b show newly generated data.

The sorting subsystem 2 rearranges the values of the exterior face data stored at random in storage according to distance from a viewing point in an ascending order. Tertiary volume data 5c is thus generated. The section enclosed in a 'rectangle in block 5c shows modified data.

The scan conversion subsystem 3 expands data concerning a triangle whose vertices are each represented in a screen coordinate system in a sequence of points whose coordinate values on a screen plane are integers. This subsystem will be detailed later.

The brightness computing subsystem 4 computes brightness values (R, G, B) and opacity α (for FTB) at screen coordinates output from the scan conversion subsystem 3 by reference to a given tetrahedral model rendering table and stores the results in the frame buffers 7. The computation of brightness and opacity will be detailed later.

(3) Exterior Face Scan Conversion

The following describes scan conversion.

Within a range where there is an exterior face (triangle) on a screen, a point of intersection is computed by a digital differential analyzer on the assumption that a viewing ray will intersect with the exterior face. Such methods of computing points of intersection, inclusive of DDAs, are termed scan conversion in the broad sense of the term. Scan conversion on a BTF occasion is effected in ascending order of priorities determined in the sorting subsystem 2, whereas scan conversion on an FTB occasion is effected in descending order of priorities. Exterior face scan conversion is conducted in the following way.

Figure 3:
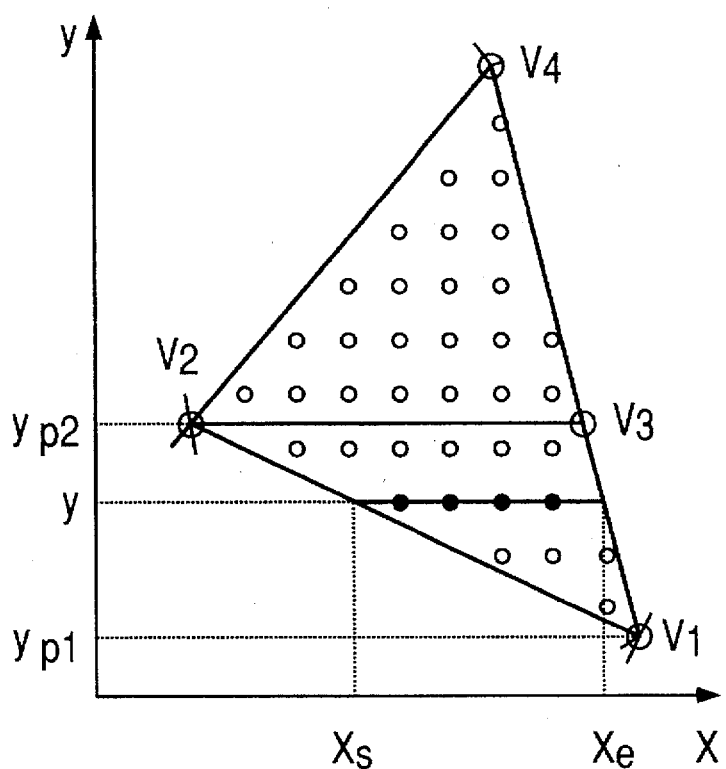
FIG. 3 is an explanatory drawing of the behavior of the scan conversion subsystem 3 shown in FIG. 1.

In FIG. 3, there is an exterior face (triangle), where a straight line is drawn through the second vertex from above in parallel to the X-axis with respect to the Y-axial direction of the screen coordinate system, so that the exterior face is divided into two parts and a fourth vertex is added. Apart from the numbers assigned to the triangle from the outset, the vertex with the lowest Y coordinate is named V1 and the vertex with the highest Y coordinate is named V4. Also, the two vertices in the same scanning line (a straight line with a constant y) between V1 and V4 are named V2 and V3, where V2 is less than V3 in terms of X coordinates. When one scanning line is raised, a variation in the X-coordinate of the point of intersection with the side V1V2 and a variation with respect to the side V1V3 are determined in advance. Prior to this processing, all values in the buffer α (the alpha component of the frame buffers) must be initialized to their maximum values when FTB viewing ray searching is carried out.

With respect to the scanning line from [yp1] (=y) to ((yp2)) (=y), where yp1 and yp2 are the Y coordinates of vertex V1 and V2 respectively, the brightness computing subsystem 4 computes brightness values from a point (x, y) (x: an integer) within the range xs,<>x<xe, where xs is the point of intersection of side V1V2 and xe is the point of intersection of side V1V3. This will be detailed later. The [p] denotes the least integer greater than or equal to p, and ((p)) denotes the greatest integer not exceeding p.

(4) Brightness Computation

The following explains how to compute brightness values.

Pixel values are computed from a point of intersection obtained by scan conversion as a point of departure while tracing the cells in the volume data until a viewing ray goes out of the volume data. The discrete brightness equations given below are solved while searching for tetrahedral cells including point (x,y) in succession in the direction of a viewing ray or in the opposite direction departing from a tetrahedral cell interfacing with an exterior face under scan conversion.

$$R = \sum_{i=0}^{n} r_i \alpha_i \prod_{j=0}^{i-1} (1 - \alpha_j)$$

-continued $$G = \sum_{i=0}^{n} g_i \alpha_i \prod_{j=0}^{i-1} (1 - \alpha_j)$$

$$B = \sum_{i=0}^{n} b_i \alpha_i \prod_{j=0}^{i-1} (1 - \alpha_j)$$

Figure 4:
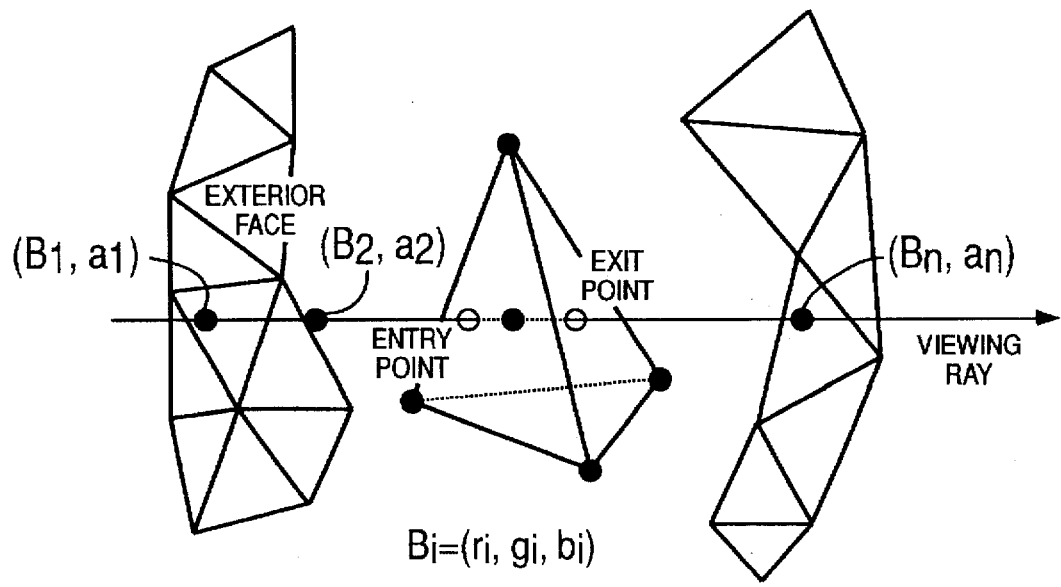
FIG. 4 is an explanatory drawing of the behavior of the brightness computing subsystem 4 shown in FIG. 1.

Brightness values (ri, gi, bi) and opacity αi are computed at a sampling point i (marked with black dots in FIG. 4; i=0 represents the sampling point nearest to a viewing ray, whereas i=n represents the sampling point farther from the viewing ray) preset along a viewing ray, and then the resulting values are substituted for the above equations. Such searching for tetrahedral cells may be continued until the viewing ray reaches an exterior face, by reference to adjacent cell information included in the given tetrahedral model.

For BTF view ray searching, the following equations apply:

Rnew=$r_i$*α$i$+Rold*(1−α$i$)

Gnew=$g_i$*α$i$+Gold*(1−α$i$)

Bnew=$b_i$*α$i$+Bold*(1−α$i$)

When the viewing line reaches an exterior face, the interim brightness values (Rold, Gold, and Bold) of red, green, and blue are stored in the frame buffers.

For FTB viewing ray searching, on the other hand, the following equations apply:

Rnew=Rold+$r_i$*α$i$*αold

Gnew=Gold+$g_i$*α$i$*αold

Bnew=Bold+$b_i$*α$i$*αold new=αold*(1−α$i$)

On a FTB occasion, once an exterior face is reached, the interim results of opacity, as well as brightness values, are also stored as old in the frame buffers.

At the i-th sampling point in the viewing ray, the corresponding brightness values (ri,gi,bi) and opacity αi are determined as below. (See FIG. 5.)

Figure 5:
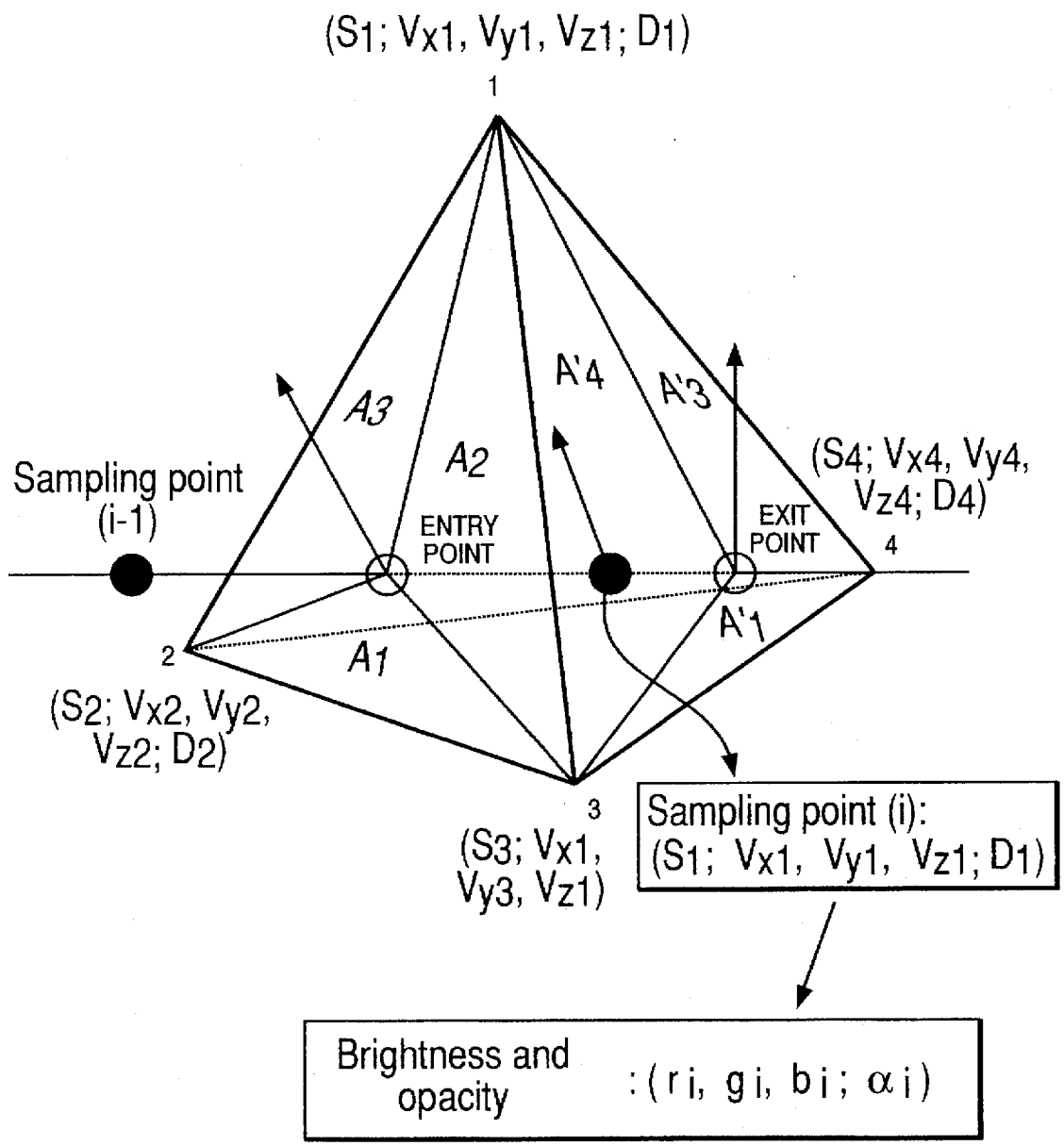
FIG. 5 is an explanatory drawing of the brightness computing subsystem 4 shown in FIG. 1.

With reference to FIG. 5, interpolational computation of gradient vector, scalar data, and distance data is carried out at each point of intersection (entry point and exit point) of a tetrahedral cell, including a sampling point, with a ray of light. Prior to this interpolational computation, the area coordinates of these points on a triangular surface, including an entry point and an exit point, must be determined in advance. These area coordinates are used as weights on the lattice point data in doing interpolational computation. The area coordinates (AP, AQ, AR) of a point X on the triangle PQR are as follows:

AP=ΔXQR/ΔPQR, AQ=ΔXRP/ΔPQR, AR=ΔXPQ/ΔPQR

Letting data defined at points P, Q, R, and X be FP, FQ, FR, and FX, respectively, we obtain:

FX=Ap*FP+AQ*FQ+AR*FR

A gradient vector and scalar date are computed by dividing the above-mentioned data by the distance from an entry point to a sampling point or the distance from a sampling point to an exit point. This computation is carried out by making use of the principle that scalar data is linearly distributed in any direction within a tetrahedron. Brightness values (ri,gi,bi) are computed on the basis of data values (Si) interpolationally computed at each sampling point, a gradient vector (Vxi, Vyi, Vzi), a suitable optical model, and a color table. Opacity αi, on the other hand, is determined from data values interpolationally computed at each sampling point in light of an opacity table. For details on the method of computation, refer to Koyamada's article, "Volume Visualization for the Unstructured Grid Data," *SPIE* Vol. 1259, pp. 14–25, 1990.

Similar brightness computation is carried out also with regard to the upper triangle (V2, V3, V4). By carrying out the above-stated processing on all exterior faces, volume rendering images are created on a screen.

As has been described so far, this invention consists of sorting exterior faces facing toward a viewing ray or sorting exterior faces facing counter to a viewing ray, determining pixels on a projection plane corresponding to those exterior faces by scan conversion in the sorting order, computing brightness values along the viewing ray passing through these pixels until the viewing ray goes out of the volume data area, and thus determining pixel values. When the volume data area is concave, a viewing ray may enter the volume data area again after it goes out of the volume data area once. In such a case, similar computation is carried out with respect to the boundaries of the entry point and the result of the computation is added to the previous value, so accurate brightness values can be computed. This invention obviates the need to run a test as to whether a viewing ray interests with a boundary, though it entails scan conversion in exterior face units. Moreover, this invention obviates the need to run a test as to whether a viewing ray enters the volume data area again, and thus enables brightness values to be computed accurately and easily.

We claim:

1. A data visualizer that transforms data distributed over a specified area of three-dimensional space into color and opacity information and displays said data in graphics on the basis of said color and opacity information, said data visualizer comprising:

means for storing information that defines two or more polyhedrons having as their vertices respective points to which said data is distributed;

a means for selecting from the stored information only a plurality of exterior faces that form a boundary of said specified area and face toward a viewing point from among the exterior faces of said polyhedrons and sorting only said plurality of exterior faces that face toward the viewing point according to distance from the viewing point, or otherwise selecting only the exterior faces that face away from a viewing point and sorting only the exterior faces that face away from the viewing point according to distance from the viewing point;

a means for specifying said selected exterior faces in said sorting order according to the distance from said viewing point, retrieving said selected exterior faces in sequence for each of said polyhedrons and carrying out the following processing:

(a) determining a viewing ray traveling through a viewing point, a pixel on a projection surface, and a point on said exterior faces, (b) determining along said viewing ray from the entry of said viewing ray into said specified area to said boundary of said specified area each polyhedron intersecting said viewing ray and the exterior faces where said viewing ray enters and exits said polyhedrons, (c) generating color and opacity information along said viewing ray on the basis of data distributed to each vertex of the polyhedrons determined by said processing (b), and (d) determining pixel values on the basis of said generated color and opacity information;

a storage means for storing said pixel values;

a means for computing new pixel values by accumulating said pixel values when there are pixel values generated for one polyhedron facing toward a viewing point or facing away from a viewing point and pixel values are to be computed for another polyhedron facing toward or away from a viewing point with respect to the corresponding pixel; and a means for displaying graphics on the basis of the pixel values stored in said storage means.

2. A data visualizer as set forth in claim 1, wherein said polyhedrons are tetrahedrons.

3. A data visualizer as set forth in claim 2, wherein said processing (a) is carried out by use of digital differential analyzer.

4. A data visualization method by which data distributed over a specified area of three-dimensional space is transformed into color and capacity information and said data is displayed in graphics on the basis of said color and opacity information, said data visualization method comprising the steps of:

selecting the exterior faces, from stored information defining two or more polyhedrons, that form a boundary of said specified area and face toward a viewing point from among the exterior faces of said two or more polyhedrons having as their vertices the respective points to which said data is distributed and sorting only said plurality of exterior faces that face toward the viewing point according to distance from the viewing point, or otherwise selecting only the exterior faces that face away from a viewing point and sorting only the exterior faces that face away from the viewing point thus selected according to distance from the viewing point;

designating said selected exterior faces in said sorting order according to the distance from said viewing point, retrieving said selected exterior faces in sequence for each of said polyhedrons and carrying out the following processing:

(a) determining a viewing ray traveling through a viewing point, a pixel on a projection surface, and a point on said exterior faces, (b) determining along said viewing ray from the entry of said viewing ray into said specified area to a boundary of said specified area each polyhedron intersecting said viewing ray and the exterior faces where said viewing ray enters and exits said polyhedrons, (c) generating color and opacity information along said viewing ray on the basis of data distributed to each vertex of the polyhedrons determined by said processing (b), and (d) determining pixel values on the basis of said generated color and opacity information;

storing said pixel values;

computing new pixel values by accumulating pixel values when there are pixel values generated for one polyhedron facing toward a viewing point or facing away from a viewing point and pixel values are to be computed for another polyhedron facing toward or away from a viewing point with respect to the corresponding pixel; and displaying graphics on the basis of the pixel values stored in said storage means.

5. A method, implemented in a computer, for enabling volume rendering of irregular lattice data, wherein said irregular lattice data is transformed into a plurality of polyhedrons, comprising:

providing a volume data area of said irregular lattice data having said plurality of polyhedrons having exterior faces facing toward a viewing ray;

sorting the exteriors faces of said polyhedrons whose normals are directed toward said viewing ray and arranging the exterior faces in order of proximity to said viewing ray;

retrieving the exterior faces of each of said polyhedrons in sequence and determining for each of said exterior faces of said polyhedrons, a viewing ray traveling through a viewing point, a pixel on a projection surface, and a point on said exterior faces of a corresponding exterior face of a selected polyhedron;

computing pixel values for said exterior faces around said viewing ray until said viewing ray exits said selected polyhedron;

storing said pixel values in a frame buffer for displaying a graphics based on said pixel values.

6. The method of claim 5 wherein the step of computing pixel values further comprise:

re-entering said volume data area with said viewing ray and determining pixels on a projection plane corresponding to a selected one of said plurality of exterior faces by scan conversion based on said sorting order; and computing brightness values along said viewing ray passing through said pixels until said viewing ray exits said volume data area.

\* \* \* \* \*

UNITED STATES PATENT AND TRADEMARK OFFICE
CERTIFICATE OF CORRECTION

PATENT NO : 5,742,293
DATED : April 21, 1998
INVENTOR(S): Koyamada et al

It is certified that error appears in the above-identified patent and that said Letters Patent is hereby corrected as shown below:

Title page,

Item [57], third line, after "area." please delete "Visualizing a Volume entails:" and insert --The present invention consists of:--.

Col. 7, line 2, after "tetrahedron." insert a paragraph break.

Signed and Sealed this

Twenty-fifth Day of May, 1999

Attest:

Q. TODD DICKINSON

*Attesting Officer*    *Acting Commissioner of Patents and Trademarks*